United States Patent
Hayashi et al.

(10) Patent No.: US 9,450,253 B2
(45) Date of Patent: Sep. 20, 2016

(54) FUEL CELL

(75) Inventors: Tomokazu Hayashi, Toyota (JP);
Naotoshi Miyamoto, Toyota (JP)

(73) Assignees: TOYOTA JIDOSHA KABUSHIKI KAISHA, Toyota-Shi (JP); TOYOTA AUTO BODY CO., LTD., Kariya-Shi (JP)

(*) Notice: Subject to any disclaimer, the term of this patent is extended or adjusted under 35 U.S.C. 154(b) by 1237 days.

(21) Appl. No.: 12/743,521

(22) PCT Filed: Aug. 27, 2009

(86) PCT No.: PCT/JP2009/064979
§ 371 (c)(1),
(2), (4) Date: May 18, 2010

(87) PCT Pub. No.: WO2010/024341
PCT Pub. Date: Mar. 4, 2010

(65) Prior Publication Data
US 2010/0285395 A1 Nov. 11, 2010

(30) Foreign Application Priority Data

Aug. 27, 2008 (JP) .................. 2008-218522
Dec. 22, 2008 (JP) .................. 2008-325604

(51) Int. Cl.
*H01M 8/0232* (2016.01)
*H01M 8/02* (2016.01)

(52) U.S. Cl.
CPC .............. *H01M 8/0232* (2013.01); *Y02E 60/50* (2013.01)

(58) Field of Classification Search
CPC ......... Y10T 29/18; Y10T 428/12361; H01M 8/0232; H01M 8/0247; H01M 4/745; H01M 8/0202; H01M 8/023; H01M 8/0258
USPC ........ 429/514, 513, 443, 454, 455, 456, 457
IPC ...................................................... H01M 8/04
See application file for complete search history.

(56) References Cited

U.S. PATENT DOCUMENTS

2005/0244702 A1* 11/2005 Horiguchi ...................... 429/34
2006/0204808 A1* 9/2006 Takada et al. .................. 429/26
2009/0239120 A1* 9/2009 Moteki ........................... 429/30

FOREIGN PATENT DOCUMENTS

| DE | 11 2007 000 017 T5 | 3/2009 | |
|---|---|---|---|
| JP | 08-138701 A | 5/1996 | |
| JP | 2002-198069 A | 7/2002 | |
| JP | 2005-310633 A | 11/2005 | |
| JP | 2006-164947 A | 6/2006 | |
| JP | 2007-026810 A | 2/2007 | |
| JP | 2007-087768 A | 4/2007 | |
| JP | 2007-250297 A | 9/2007 | |
| WO | WO 2008050215 A1 * | 5/2008 | .............. H01M 8/02 |

* cited by examiner

*Primary Examiner* — Basia Ridley
*Assistant Examiner* — Heng Chan
(74) *Attorney, Agent, or Firm* — Kenyon & Kenyon LLP

(57) ABSTRACT

In a fuel cell having a cell structure in which a gas flow passage is formed by an expanded metal, a bond portion connecting a mesh of the expanded metal stands partially upright in a position where a bond length is shortened so as to form a part of a strand portion. Hence, in an opening formed by the mesh of the expanded metal, a surface area on which front and rear openings overlap in a direction increases when seen from an direction. Thus, a sectional area of gas flow passages constituted by a continuum in the direction of the openings overlapping in the direction increases. As a result, a gas flow flows without making repeated narrow turns, leading to a reduction in gas pressure loss.

28 Claims, 21 Drawing Sheets

F I G. 1 (a)
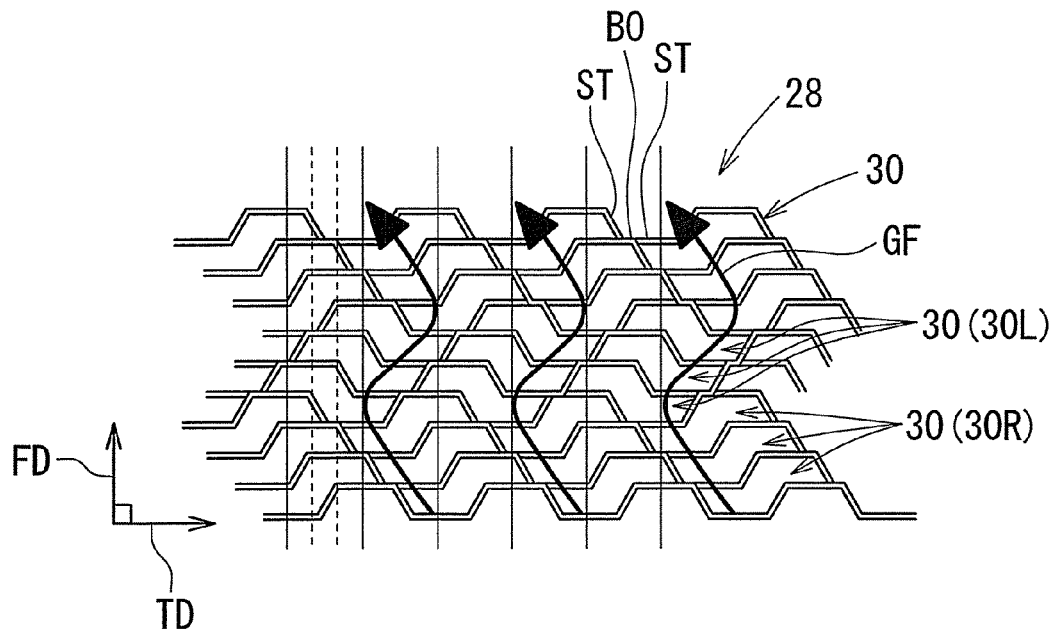
F I G. 1 (b)
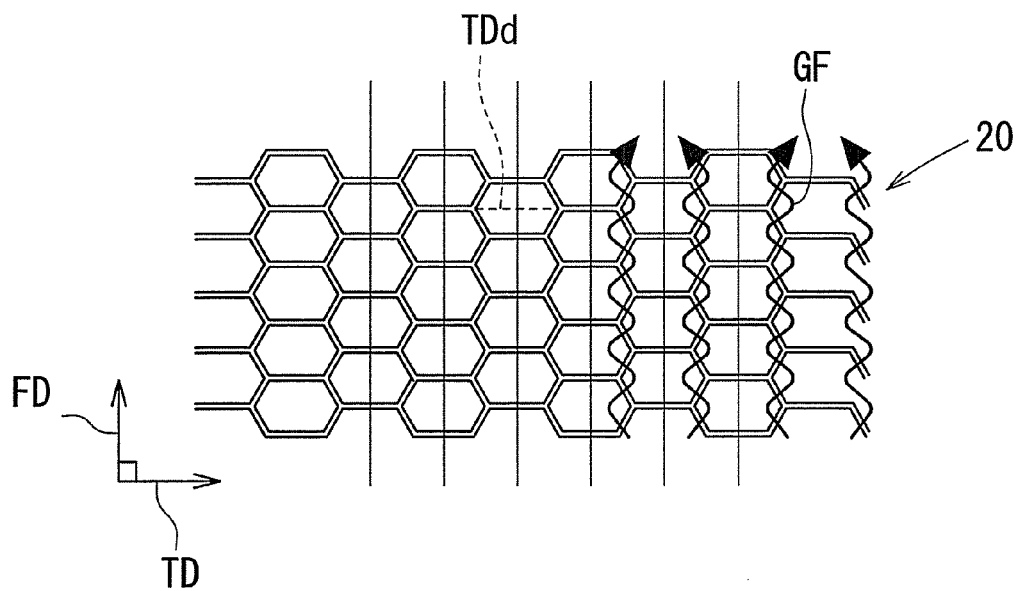

F I G. 2(a)
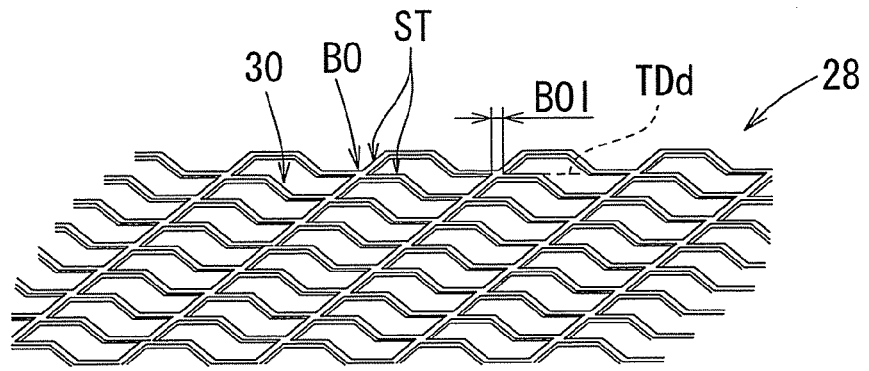
F I G. 2(b)
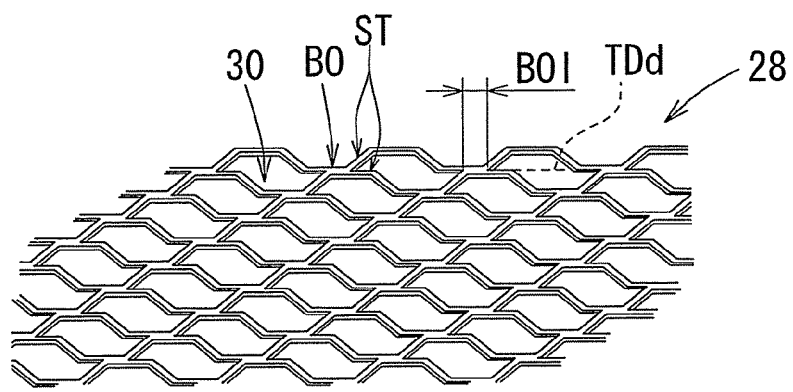
F I G. 2(c)
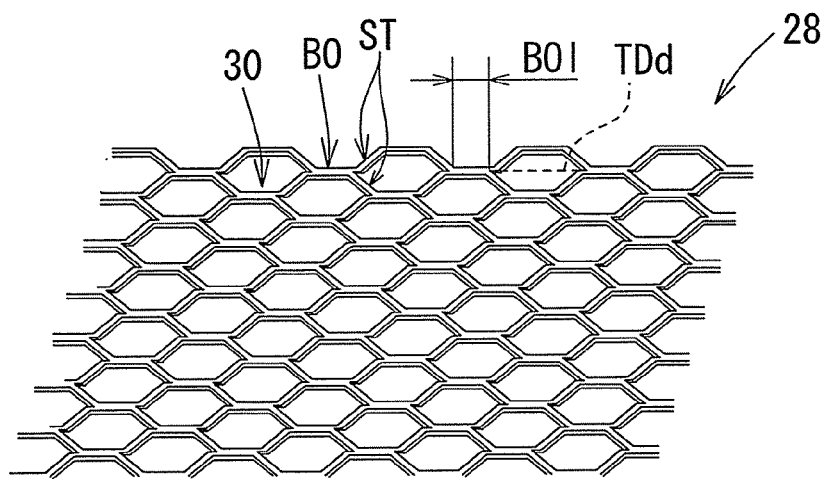

F I G. 3(a)
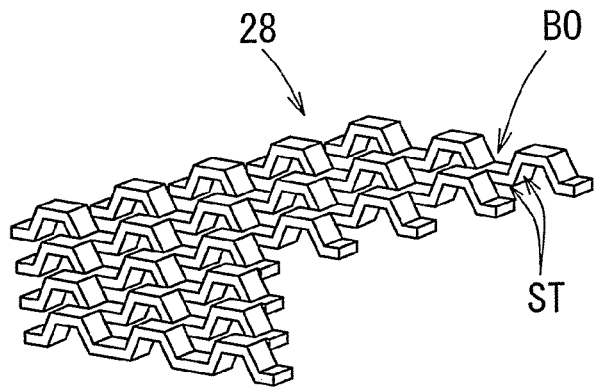
F I G. 3(b)
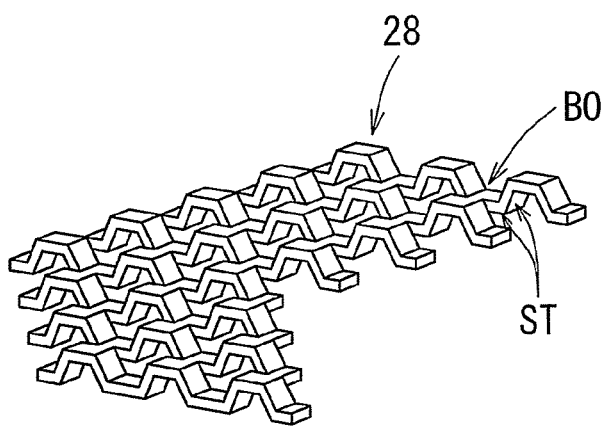
F I G. 3(c)
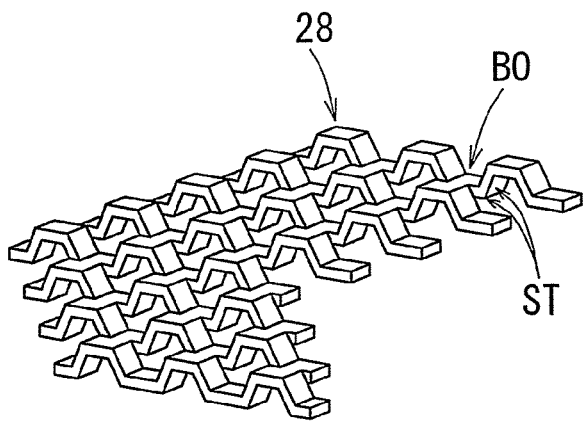

F I G. 4
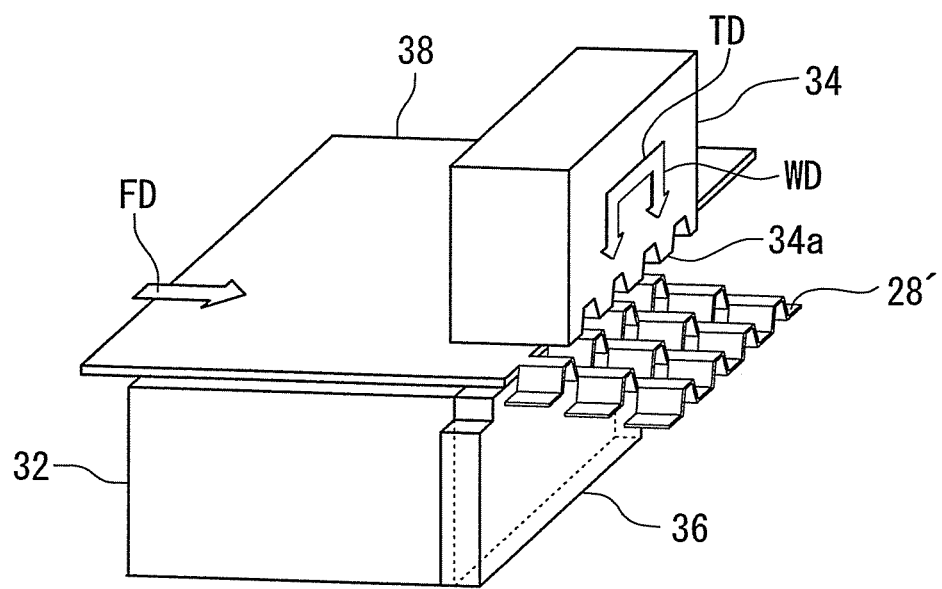

F I G. 5
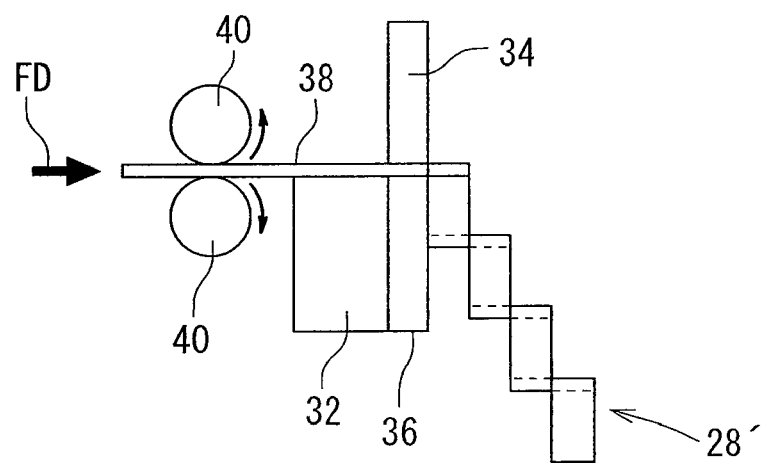

F I G. 7 (a)
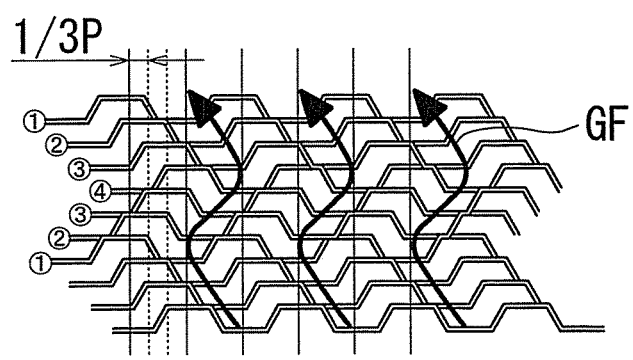
F I G. 7 (b)
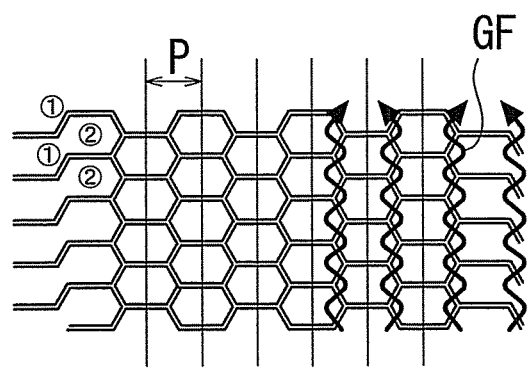

F I G. 8
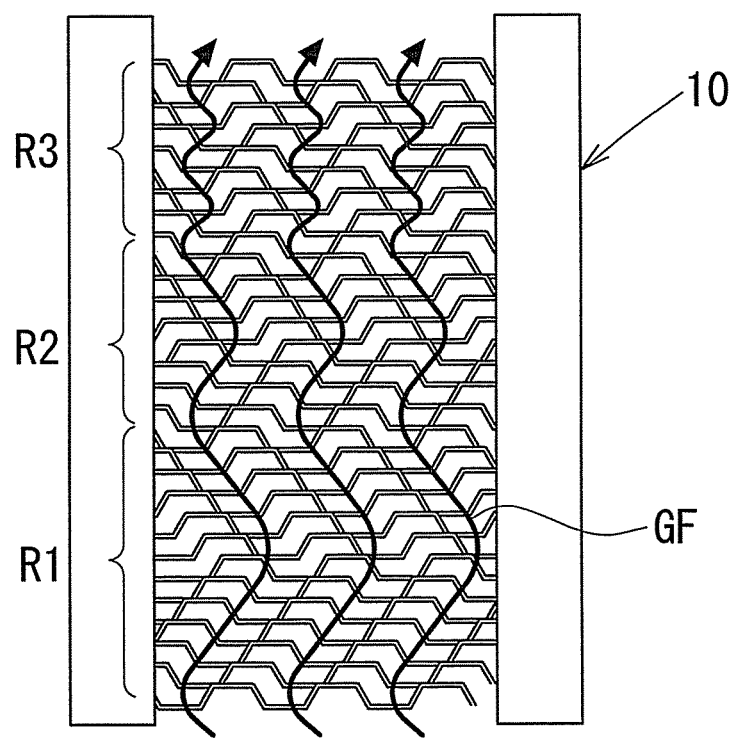

F I G. 9 (a)
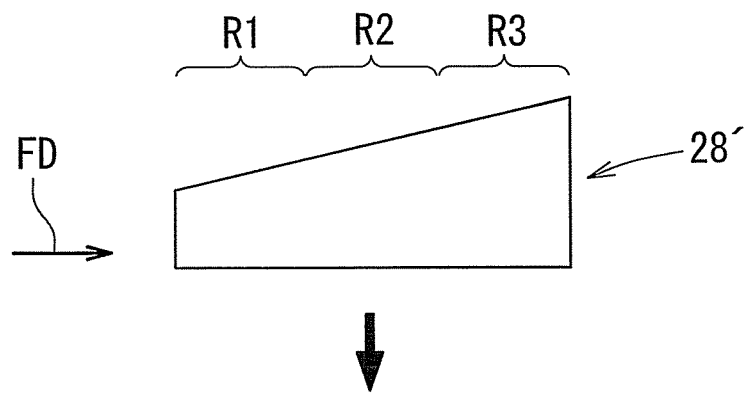
F I G. 9 (b)

F I G. 1 0
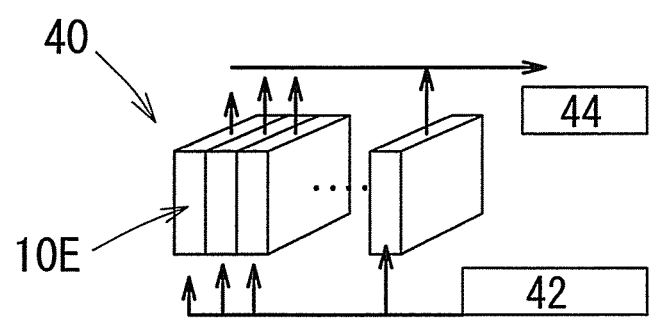

F I G. 1 1 (a)
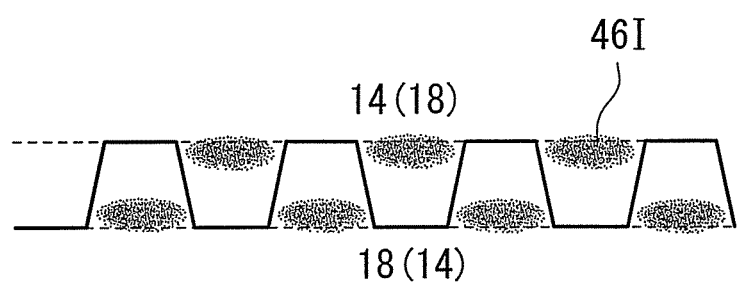
F I G. 1 1 (b)
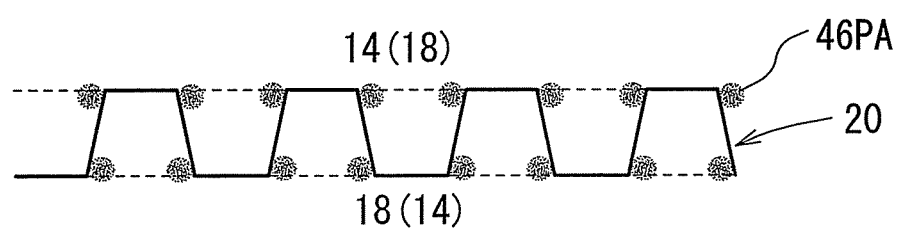

F I G. 1 2
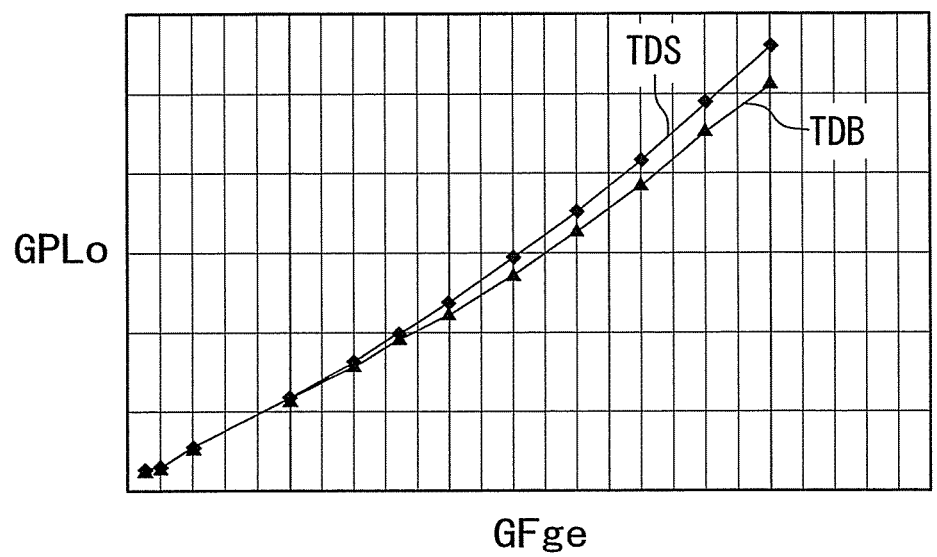

F I G. 1 3
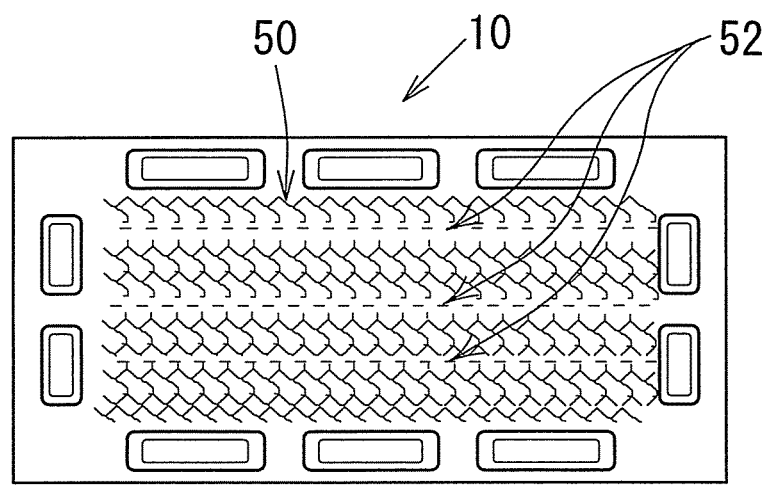

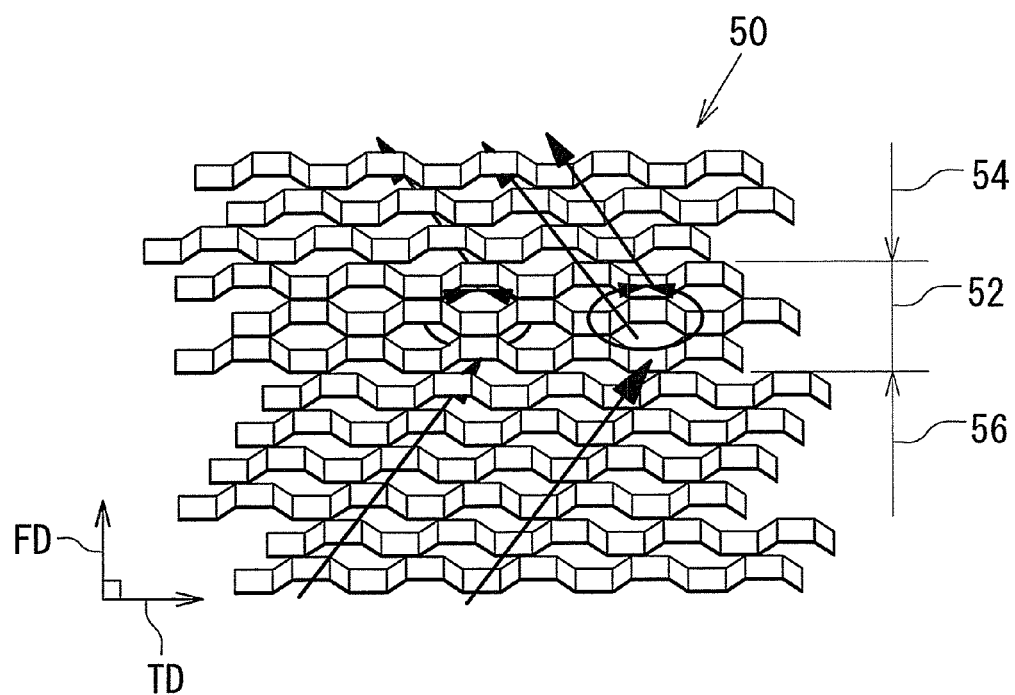
F I G. 1 4

F I G. 1 5 (a)
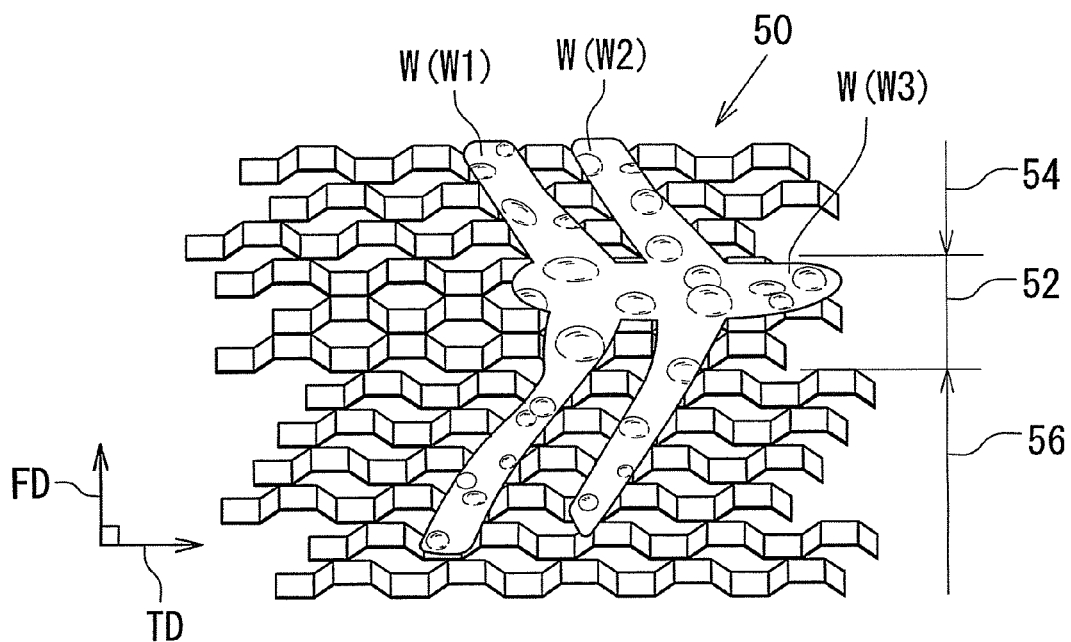
F I G. 1 5 (b)
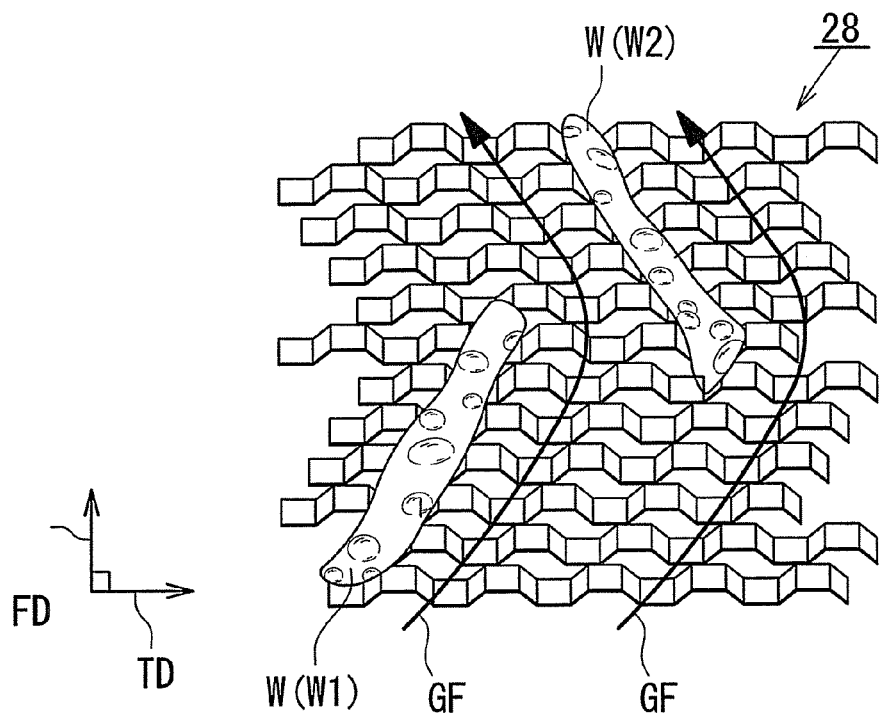

F I G. 1 6
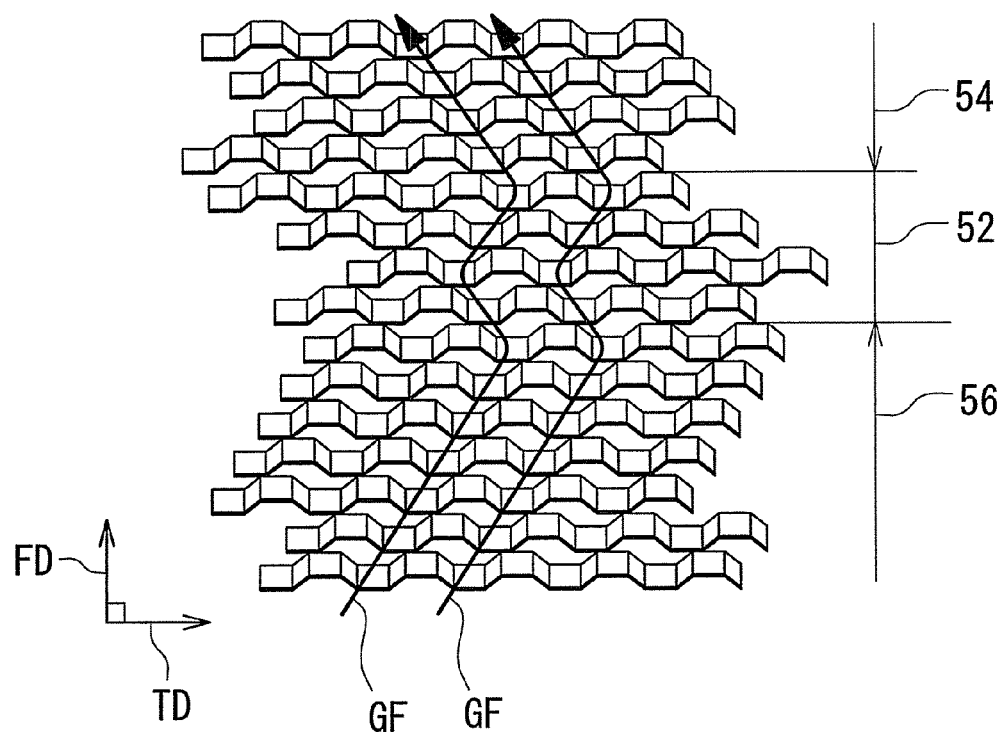

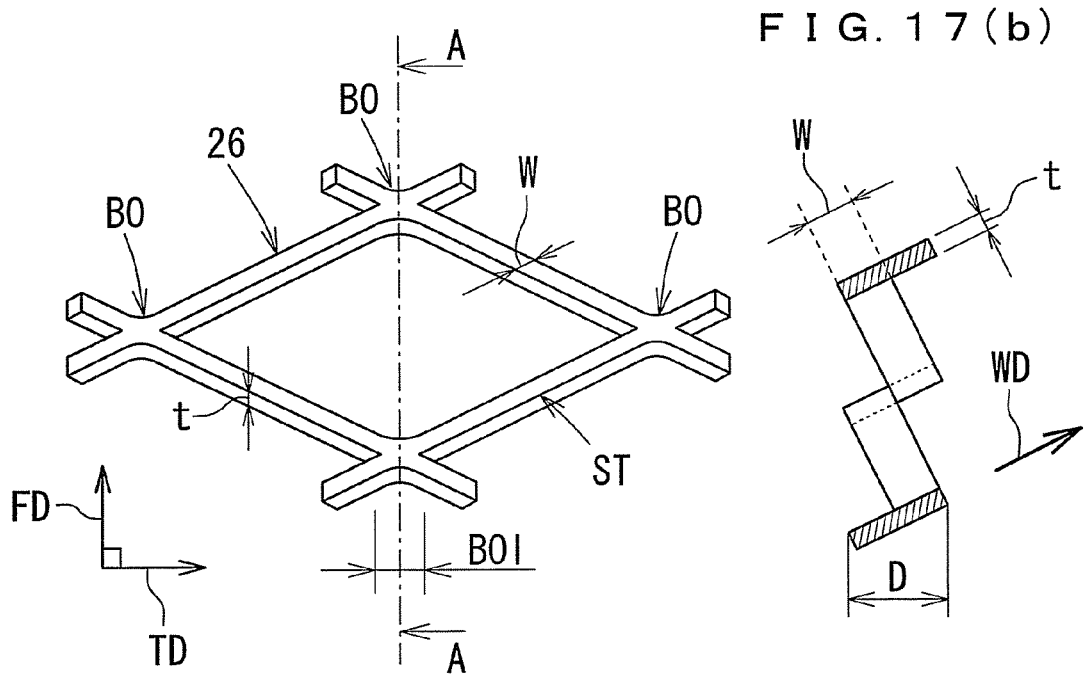
FIG. 17(a)
FIG. 17(b)
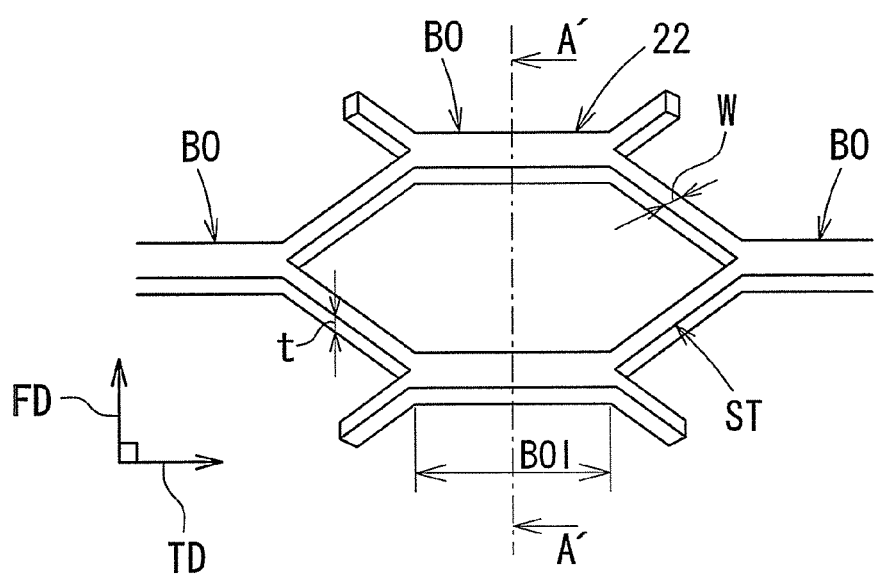
FIG. 17(c)

F I G. 1 8
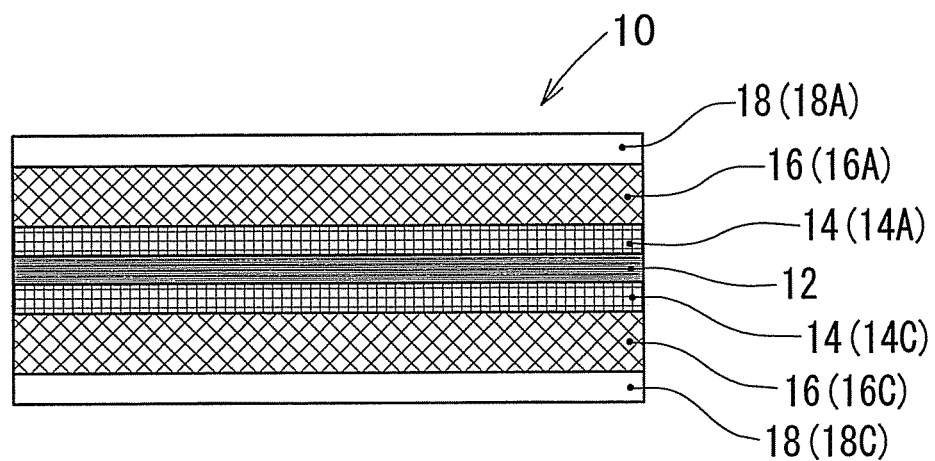

F I G. 1 9
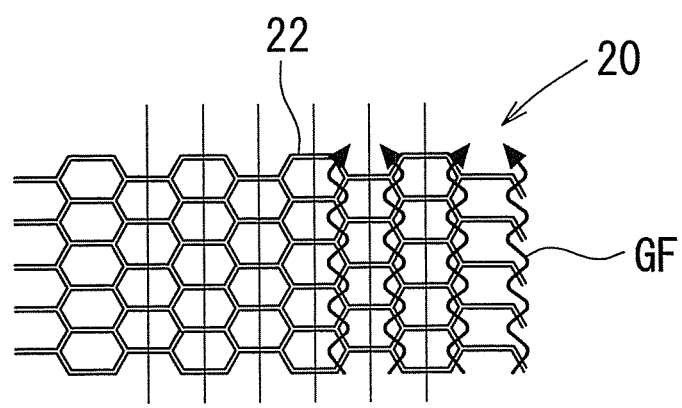

F I G. 2 0
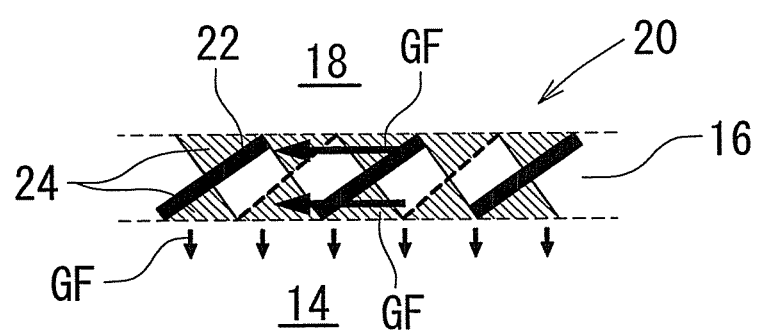

F I G. 2 1 (a)
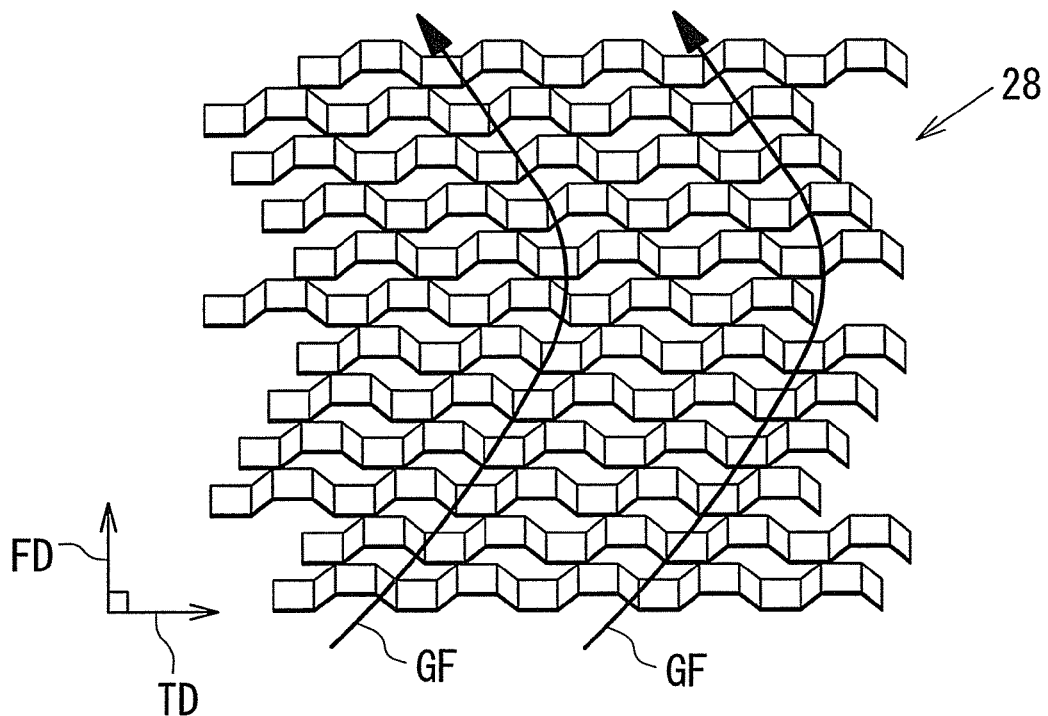
F I G. 2 1 (b)
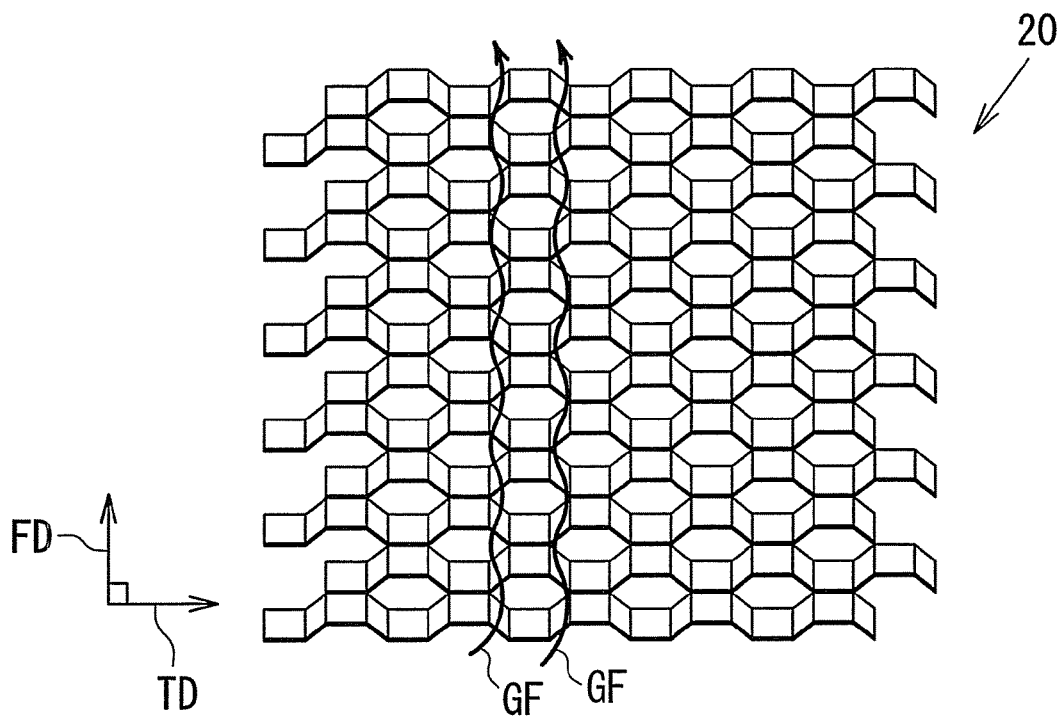

FUEL CELL

This is a 371 national phase application of PCT/JP2009/064979 filed 27 Aug. 2009, claiming priority to Japanese Patent Application No. JP 2008-218522 filed 27 Aug. 2008, and JP 2008-325604 filed 22 Dec. 2008, respectively, the contents of which are incorporated herein by reference.

FIELD OF THE INVENTION

The present invention relates to a fuel cell.

BACKGROUND OF THE INVENTION

In a fuel cell, a cell (single cell) serving as a minimum unit is formed by stacking a plurality of cell constitutional members, and by forming a stack structure in which a plurality of cells are stacked, a required voltage is secured. A separator constituted by a plate-shaped component is used in the stack structure as a member that is positioned on an outermost layer of each cell to separate each of the cells in the stack. Further, the separator functions to supply a fuel gas to an anode side and an oxidant to a cathode side, carry electricity generated by the cell, discharge generated water generated in the cell, and so on.

FIG. 18 shows an example of the cell structure of a polymer electrolyte fuel cell. A cell 10 is structured by disposing a membrane electrode assembly 12 ("MEA" hereafter) in a central portion of the cell 10 in a thickness direction, and disposing a gas diffusion layer 14 (anode side/cathode side gas diffusion layers 14A, 14C), a gas flow passage 16 (anode side/cathode side gas flow passages 16A, 16C), and a separator 18 (anode side/cathode side separators 18A, 18C) on either side of the MEA 12. Note that a structure formed by integrating the MEA 12 and the gas diffusion layer 14 may be known as a MEGA (Membrane Electrode & Gas Diffusion Layer Assembly).

In the structure of the cell 10 shown in FIG. 18, in which the gas flow passage 16 is formed as a separate structure to the separator 18, the aforementioned functions of the separator are secured by employing an expanded metal, for example, as a structure for forming the gas flow passage 16 (see Patent Documents 1 and 2, for example).

Patent Document 1: Japanese Patent Application Publication No. JP-A-2005-310633

Patent Document 2: Japanese Patent Application Publication No. JP-A-2002-198069

SUMMARY OF THE INVENTION

Problem to be Solved by the Invention

An expanded metal 20 used as the structure for forming the gas flow passage 16 in the cell 10 is a continuous structure in which a hexagonal mesh 22 shown in FIG. 19 is disposed in a so-called zigzag pattern, for example. The expanded metal 20 is subjected to a manufacturing process (to be described below) in which slits are cut one step at a time in a flat plate-shaped material using a mold while feeding the material in order to form the mesh 22, whereby each mesh 22 forms a continuous staircase-shaped structure in a (materials) forwarding direction (to be referred to in the present invention as an "FD direction").

The mesh 22 constituted by the expanded metal 20 is then disposed in the cell 10 shown in FIG. 18 between the gas diffusion layer 14 and the separator 18 so as to form an inclined surface, whereby triangular gas flow passages 24, indicated by a shaded portion in FIG. 20, are formed in a zigzag pattern between the zigzag mesh 22 and respective surfaces of the gas diffusion layer 14 and separator 18. As a result, gas flowing through the gas flow passage 16 flows in the FD direction in sequence through the triangular gas flow passages 24 formed in a zigzag pattern. At this time, as shown in FIG. 19, a gas flow GF oscillates in the FD direction and an orthogonal direction thereto (a transverse direction or a tool direction, to be referred to in the present invention as a "tool forwarding direction" or a "TD direction"), and thus the gas flow GF flows while making extremely narrow turns repeatedly.

When the gas flow GF through the gas flow passage 16 makes extremely narrow turns repeatedly in the manner shown in FIG. 19, pressure loss in the gas flowing through the gas flow passage 16 increases. Therefore, to secure a required gas flow, requirements for performance of an air compressor, a hydrogen circulation pump, and so on must necessarily become high, leading to an increase in the size of these accessories and a corresponding increase in the size of the fuel cell system. Furthermore, the triangular gas flow passages 24 disposed in a zigzag pattern also serve as discharge paths for generated water generated in the cell, but the gas flow passages according to this constitution have a small passage sectional area, and it is therefore difficult to discharge generated water from the cell smoothly. As a result, a diffusion overvoltage increases, leading to a reduction in output and a reduction in voltage stability.

To ensure that the generated water is discharged smoothly, a drainage performance may be improved by increasing a gas flow velocity toward a flow passage outlet (see "Patent Document 2" cited above), but since pressure loss in the triangular gas flow passages 24 disposed in a zigzag pattern occurs uniformly over the entire gas flow passage 16 and the flow velocity of the gas through the gas flow passage 16 is constant, the gas flow velocity remains more or less constant over the entire flow passage 16.

The present invention has been designed in consideration of the problems described above, and it is an object of the present invention to reduce pressure loss in a gas flowing through a gas flow passage of a cell as required such that a gas flow can be increased appropriately, the size of a fuel cell system can be reduced, an output of the system can be increased, voltage stability can be secured, and so on.

Means for Solving the Problem

To solve the problems described above, a fuel cell according to the present invention is a fuel cell having a cell structure in which a gas flow passage is formed by an expanded metal disposed between cell constitutional members, wherein gas pressure loss between cell constitutional members can be controlled appropriately by modifying a mesh shape of an expanded metal.

(Forms of the Invention)

The following forms of the invention illustrate examples of the constitution of the present invention, and are itemized to facilitate comprehension of the various constitutions of the present invention. The respective items do not limit the technical scope of the present invention, and the technical scope of the present invention may include configurations in which the constitutional elements of each item are partially replaced, omitted, or supplemented by additional constitutional elements while taking into consideration the best modes for carrying out the invention.

(1) In a fuel cell having a cell structure in which a gas flow passage is formed by an expanded metal disposed between cell constitutional members, a bond portion connecting a mesh of the expanded metal stands partially upright in a position where a bond length is shortened so as to form a part of a strand portion (claim 1).

In the fuel cell according to this item, the bond portion connecting the mesh of the expanded metal stands partially upright in a position where the bond length is shortened so as to form a part of the strand portion. Hence, in an opening formed by the mesh of the expanded metal, a surface area on which front and rear openings overlap in a TD direction increases from an FD direction. Thus, a sectional area of a plurality of substantially channel-shaped gas flow passages constituted by a continuum in the FD direction of the openings overlapping in the TD direction increases. As a result, gas flows through the gas flow passage formed by the expanded metal disposed between the cell constitutional members without making repeated narrow turns, leading to a reduction in gas pressure loss.

(2) In a fuel cell having a cell structure in which a gas flow passage is formed by an expanded metal disposed between cell constitutional members, a part of a strand portion constituting a mesh of the expanded metal is formed as a continuous surface not having a step relative to a bond portion (claim 2).

In the fuel cell according to this item, a part of the strand portion constituting the mesh of the expanded metal is formed as a continuous surface not having a step relative to the bond portion. Hence, in the opening formed by the mesh of the expanded metal, the surface area on which the front and rear openings overlap in the TD direction increases from the FD direction. Thus, the sectional area of the plurality of substantially channel-shaped gas flow passages constituted by the continuum in the FD direction of the openings overlapping in the TD direction increases. As a result, gas flows through the gas flow passage formed by the expanded metal disposed between the cell constitutional members without making repeated narrow turns, leading to a reduction in gas pressure loss.

(3) In the fuel cell according to items (1) and (2), a shape of an opening formed by the mesh of the expanded metal is basically hexagonal when seen from a step width direction of the mesh, and becomes polygonal when one trapezoid formed by halving the hexagon along a diagonal of a TD direction is shifted relative to the other trapezoid in the TD direction (claim 3).

In the fuel cell according to this item, the bond portion connecting the mesh of the expanded metal stands partially upright in a position where the bond length is shortened so as to form a part of the strand portion, or a part of the strand portion constituting the mesh of the expanded metal is formed as a continuous surface not having a step relative to the bond portion, and therefore the shape of the opening formed by the mesh of the expanded metal is basically hexagonal when seen from the step width direction of the mesh, and becomes polygonal when one trapezoid formed by halving the hexagon along the diagonal of the tool forwarding direction is shifted relative to the other trapezoid in the tool forwarding direction. Hence, the TD direction width of the opening shape when seen from the FD direction is larger than that of the basic hexagon, and the surface area on which the front and rear openings overlap in the TD direction increases from the FD direction. Thus, the sectional area of the plurality of substantially channel-shaped gas flow passages constituted by the continuum in the FD direction of the openings overlapping in the TD direction increases. As a result, gas flows through the gas flow passage formed by the expanded metal disposed between the cell constitutional members without making repeated narrow turns, leading to a reduction in gas pressure loss.

Note that as a shift amount by which one of the trapezoids formed by halving the hexagon along the diagonal of the TD direction is shifted relative to the other trapezoid in the TD direction increases, the surface area by which the front and rear openings overlap in the TD direction increases from the FD direction, leading to an increase in the sectional area of the plurality of substantially channel-shaped gas flow passages constituted by the continuum in the FD direction of the openings overlapping in the TD direction.

(4) In a fuel cell having a cell structure in which a gas flow passage is formed by an expanded metal disposed between cell constitutional members, an opening shape of the expanded metal is basically hexagonal when seen from a step width direction of the mesh, and becomes polygonal when one trapezoid formed by halving the hexagon along a diagonal of a TD direction is shifted relative to the other trapezoid in the TD direction (claim 4).

In the fuel cell according to this item, the shape of the opening formed by the mesh of the expanded metal is basically hexagonal when seen from the step width direction of the mesh (also referred to as a "WD direction" hereafter), and becomes a polygonal shape when one trapezoid formed by halving the hexagon along a diagonal of the TD direction is shifted relative to the other trapezoid in the TD direction. Hence, the TD direction width of the opening shape when seen from the FD direction is larger than that of the basic hexagon, and the surface area on which the front and rear openings overlap in the TD direction increases from the FD direction. Thus, the sectional area of the plurality of substantially channel-shaped gas flow passages constituted by the continuum in the FD direction of the openings overlapping in the TD direction increases. As a result, gas flows through the gas flow passage formed by the expanded metal disposed between the cell constitutional members without making repeated narrow turns, leading to a reduction in gas pressure loss.

(5) In the fuel cell according to items (3) and (4), a direction in which one of the trapezoids formed by halving the hexagon of the opening formed by the mesh of the expanded metal along the diagonal of the TD direction is shifted relative to the other trapezoid is shifted in an identical TD direction over a plurality of openings arranged in an FD direction (claim 5).

In the fuel cell according to this item, the direction in which one of the trapezoids formed by halving the hexagon of the opening formed by the mesh of the expanded metal along the diagonal of the TD direction is shifted relative to the other trapezoid is shifted in an identical TD direction over a plurality of openings arranged in the FD direction, and therefore the plurality of substantially channel-shaped gas flow passages constituted by the continuum in the FD direction of the openings overlapping in the TD direction are formed as flow passages oriented in an identical TD direction over the plurality of openings arranged in the FD direction. In other words, the gas flow forms an FD direction flow that deviates toward an identical TD direction without meandering while flowing through the plurality of openings shifted in an identical TD direction, and as a result, a reduction in gas pressure loss can be achieved. When the shift direction is modified, the gas flow turns in the opposite TD direction in the modification position and then forms an FD direction flow that deviates toward an identical TD direction without meandering while flowing through the plurality of openings shifted in an identical TD direction. Thus, the position (timing) in which the flow direction of the gas flow turns is adjusted appropriately in accordance with the number in the FD direction of the openings shifted in an identical TD direction.

(6) In the fuel cell according to item (5), a continuous number in the FD direction of the openings shifted in the identical TD direction differs in each location or region of the expanded metal (claim 6).

In the fuel cell according to this item, the continuous number in the FD direction of the openings shifted in an identical TD direction differs in each location or region of the expanded metal, and therefore the gas flow (turn frequency, flow velocity, gas pressure loss, and so on) can be adjusted appropriately in each location (a small spot) or region (an area having a comparatively large range) of a single cell.

(7) In the fuel cell according to items (3) to (6), a shift amount by which one of the trapezoids formed by halving the hexagon of the opening formed by the mesh of the expanded metal along the diagonal of the TD direction is shifted relative to the other trapezoid in the TD direction differs in each location or region of the expanded metal (claim 7).

As described above in item (3), as the shift amount by which one of the trapezoids formed by halving the hexagon along the diagonal of the TD direction is shifted relative to the other trapezoid in the TD direction increases, the surface area by which the front and rear openings overlap in the TD direction increases from the FD direction, leading to an increase in the sectional area of the plurality of substantially channel-shaped gas flow passages constituted by the continuum in the FD direction of the openings overlapping in the TD direction. Hence, in the fuel cell according to this item, by causing the shift amount by which one of the trapezoids formed by halving the hexagon of the opening formed by the mesh of the expanded metal along the diagonal of the TD direction is shifted relative to the other trapezoid in the TD direction to differ in each location or region of the expanded metal, the gas flow (flow velocity, gas pressure loss, and so on) can be adjusted appropriately in each location or region of a single cell.

(8) In the fuel cell according to items (3) to (7), all of the openings formed by the mesh of the expanded metal are polygonal when seen from the WD direction (claim 8).

In the fuel cell according to this item, all of the openings are polygonal when seen from the WD direction, and therefore the TD direction width when seen from the FD direction is larger than that of the basic hexagon, and the surface area on which the front and rear openings overlap in the TD direction increases from the FD direction. Thus, the sectional area of the plurality of substantially channel-shaped gas flow passages constituted by the continuum in the FD direction of the openings overlapping in the TD direction increases. As a result, gas flows through the entire region of the gas flow passage formed by the expanded metal disposed between the cell constitutional members without making repeated narrow turns, leading to a reduction in gas pressure loss.

(9) The fuel cell according to items (3) to (7) includes a location or region in which the shift amount by which one of the trapezoids formed by halving the hexagon of the opening formed by the mesh of the expanded metal along the diagonal of the TD direction is shifted relative to the other trapezoid in the TD direction is either zero or smaller than the shift amount in another location or region adjacent thereto in the FD direction (claim 9).

In the fuel cell according to this item, in the location or region in which the shift amount by which one of the trapezoids formed by halving the hexagon of the opening formed by the mesh of the expanded metal along a diagonal of the TD direction is shifted relative to the other trapezoid in the TD direction is either zero (when zero, the opening takes the basic hexagonal shape) or smaller than that of other locations or regions adjacent thereto in the FD direction, the sectional area of the plurality of substantially channel-shaped gas flow passages constituted by the continuum in the FD direction of the openings overlapping in the TD direction is partially reduced. As a result, the gas flow flowing through the gas flow passage formed by the expanded metal disposed between the cell constitutional members is partially throttled such that a part of generated water flowing toward a gas flow passage outlet diverges in the TD direction. The generated water flowing through the plurality of substantially channel-shaped gas flow passages disposed in parallel then comes into contact such that a single water flow is formed by mutual surface tension, and as a result, water discharge through another gas flow passage is promoted. Hence, an increase in gas pressure loss due to residual generated water can be suppressed.

(10) In the fuel cell according to item (9), the continuum in the shift direction of the openings shifted in the identical TD direction is interrupted on either side of the location or region in which the shift amount by which one of the trapezoids formed by halving the hexagon of the opening formed by the mesh of the expanded metal along the diagonal of the TD direction is shifted relative to the other trapezoid in the TD direction is either zero or smaller than the shift amount in another location or region adjacent thereto in the FD direction (claim 10).

By constructing the fuel cell according to this item in this manner, an elbow portion or a crank portion is partially formed in the plurality of substantially channel-shaped gas flow passages constituted by the continuum in the FD direction of the openings overlapping in the TD direction. As a result, the gas flow flowing through the gas flow passages formed by the expanded metal disposed between the cell constitutional members partially curves or meanders in the elbow portion or crank portion such that a part of the gas flow diverges in the TD direction, causing a part of the generated water flowing toward the gas flow passage outlet to diverge in the TD direction. The generated water flowing through the plurality of substantially channel-shaped gas flow passages disposed in parallel then comes into contact such that a single water flow is formed by mutual surface tension, and as a result, water discharge through the gas flow passage is promoted. Hence, an increase in gas pressure loss due to residual generated water can be suppressed.

(11) In the fuel cell according to items (5) to (10), at least one of a continuous number in the FD direction of the openings shifted in the identical TD direction, the shift amount by which one of the trapezoids formed by halving the hexagon of the opening formed by the mesh of the expanded metal along the diagonal of the TD direction is shifted relative to the other trapezoid in the TD direction, and the location or region in which the shift amount is either zero or smaller than the shift amount in another location or region adjacent thereto in the FD direction, is varied in each of a plurality of stacked cells (claim 11).

In the fuel cell according to this item, at least one of the continuous number in the materials forwarding direction of the openings shifted in an identical TD direction, the shift amount by which one of the trapezoids formed by halving the hexagon of the opening formed by the mesh of the expanded metal along the diagonal of the TD direction is shifted relative to the other trapezoid in the TD direction, and the location or region in which the shift amount is either zero or smaller than the shift amount in another location or region adjacent thereto in the FD direction, is varied in each of the plurality of stacked cells, and therefore the gas flow can be adjusted appropriately to an optimum gas flow in each cell.

(12) In items (1) to (11), at least one of a step width and a step depth of the mesh of the expanded metal differs in the FD direction while an overall thickness thereof is fixed in the FD direction (claim 12).

As will be described below, the expanded metal used as a structure for forming the gas flow passages in the cell is manufactured through a process in which a mesh is formed by inserting slits into a flat plate material one step at a time using a mold while feeding the material, and therefore the strand width of the mesh increases as the step width of the mesh increases. Hence, in the fuel cell according to this item, at least one of the step width and the step depth of the mesh of the expanded metal is varied in the FD direction while an overall thickness thereof is fixed in the FD direction, and as a result, in a location or region in which the step width of the mesh is large, an opening length per mesh is large (the mesh is coarse) when seen from the FD direction. In a location or region in which the step width of the mesh is small, on the other hand, the opening length per mesh is short (the mesh is fine) when seen from the FD direction. Hence, in a location or region where the step width of the mesh is large, the gas flows while making wide turns, whereas in a location or region where the step width of the mesh is small, the gas flows while making narrow turns. Thus, the position (timing) in which the flow direction of the gas flow turns can be adjusted appropriately in accordance with the step width of the mesh.

EFFECTS OF THE INVENTION

By constituting the present invention in the manner described above, pressure loss in the gas flowing through the gas flow passage of the cell can be reduced as required, leading to an appropriate increase in the gas flow rate, a reduction in the size of the fuel cell system, an increase in the output of the system, voltage stability, and so on.

BRIEF DESCRIPTION OF THE DRAWINGS

FIG. 1 is an illustrative view showing the structure of an expanded metal serving as a gas flow passage formation member in a fuel cell according to a first embodiment of the present invention, wherein FIG. 1A is a view showing the expanded metal according to the first embodiment of the present invention in a step width direction of a mesh, and FIG. 1B is a view showing a hexagonal expanded metal serving as a basis of the expanded metal shown in FIG. 1A from the step width direction of the mesh;

FIGS. 2A to 2C show variations of an opening shape of the expanded metal according to the first embodiment of the present invention;

FIGS. 3A to 3C are perspective views of the expanded metal shown in FIGS. 2A to 2C;

FIG. 4 is a perspective pattern diagram showing a mold of a manufacturing device for manufacturing the expanded metal according to the first embodiment of the present invention;

FIG. 5 is a schematic side view showing the mold and a roller of the manufacturing device for manufacturing the expanded metal according to the first embodiment of the present invention;

FIG. 7 is an illustrative view showing a shift operation for shifting an upper mold of the manufacturing mold for manufacturing the expanded metal according to the first embodiment of the present invention in a TD direction and showing the expanded metal from the step width direction, wherein FIG. 7A shows an operation of the upper mold for molding the expanded metal according to the first embodiment of the present invention, and FIG. 7B shows an operation of the upper mold for molding the hexagonal expanded metal that serves as the basis of the expanded metal according to the first embodiment of the present invention;

FIG. 8 is a pattern diagram showing a fuel cell including the expanded metal according to the first embodiment of the present invention, in which a number of continuous formations formed during continuous feeding in an identical TD direction is varied in each location or region;

FIG. 9 is a pattern diagram showing an example of a manufacturing process for manufacturing the expanded metal according to the first embodiment of the present invention in which a step width is varied gradually such that the step width in a region close to a gas flow inlet of a cell is narrow, the step width in a region close to the gas flow outlet is wide, and the step width in an intermediate region between the gas flow inlet and the gas flow outlet is an intermediate width, wherein FIG. 9A shows a lathe cut metal and FIG. 9B shows an expanded metal obtained by rolling the lathe cut metal;

FIG. 10 is a pattern diagram of a fuel cell stack according to the first embodiment of the present invention;

FIG. 11 is an image diagram of a gas flow passage formed in a fuel cell by the expanded metal, wherein FIG. 11A shows a gas flow passage according to the first embodiment of the present invention, and FIG. 11B shows a gas flow passage formed by the hexagonal expanded metal serving as the basis of the expanded metal according to the first embodiment of the present invention;

FIG. 12 is a graph showing a relationship between a gas flow rate during power generation and gas pressure loss during power generation corresponding to different shift amounts by which one trapezoid formed by halving a hexagon serving as a basic opening shape of the expanded metal according to the first embodiment of the present invention along a diagonal of the TD direction is shifted relative to the other trapezoid in the TD direction;

FIG. 13 is a plan view of a cell including an expanded metal serving as a gas flow passage formation member of a fuel cell according to a second embodiment of the present invention;

FIG. 14 is a partial perspective view showing the expanded metal serving as the gas flow passage formation member of the fuel cell according to the second embodiment of the present invention;

FIG. 15A shows a generated water flow through the gas flow passage formed by the expanded metal shown in FIG. 14, and FIG. 15B shows, as a comparative example, a generated water flow that can be generated in the gas flow passage formed by the expanded metal according to the first embodiment of the present invention;

FIG. 16 is a partial perspective view showing an application example of the expanded metal serving as the gas flow passage formation member of the fuel cell according to the second embodiment of the present invention;

FIG. 17 is an illustrative view showing respective parts of the expanded metal, wherein FIG. 17A is a plan view of a rhomboid mesh, FIG. 17B is a sectional view taken along an A-A line and an A'-A' line, and FIG. 17C is a plan view of a hexagonal mesh;

FIG. 18 is a sectional view showing an example of a cell structure in a conventional polymer electrolyte fuel cell;

FIG. 19 is a view showing an expanded metal constituted by a hexagonal mesh, which is used to form a gas flow passage in the cell shown in FIG. 18, from a step width direction of the mesh;

FIG. 20 is a sectional view showing a gas flow passage of a conventional cell, employing the expanded metal shown in FIG. 19; and FIG. 21 is a reference diagram showing the respective structures of the expanded metals for forming gas flow passages in the fuel cells according to the related art and the first embodiment of the present invention, wherein FIG. 21A is a three-dimensional view corresponding to FIG. 1A, and FIG. 21B is a three-dimensional view corresponding to FIG. 1B.

BEST MODES FOR CARRYING OUT THE INVENTION

Figure 6:
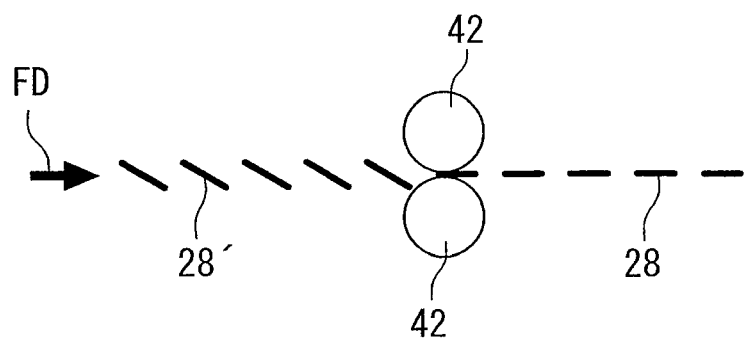
FIG. 6 is a schematic side view showing a rolling roller of the manufacturing device for manufacturing the expanded metal according to the first embodiment of the present invention.

Embodiments of the present invention will be described below on the basis of the attached drawings. Note that parts which are identical to or correspond to the related art will not be described in detail.

First, to describe the embodiments of the present invention, the names of respective parts of an expanded metal will be clarified with reference to FIG. 17. The expanded metal is typically a continuous structure in which the hexagonal mesh 22 described above (see FIG. 19 and FIG. 17C) and a rhomboid mesh 26 such as that shown in FIG. 17A are disposed in a so-called zigzag arrangement. An intersection portion of the mesh will be referred to as a bond portion BO, and a part that connects the bond portions BO of the mesh will be referred to as a strand portion ST. A length of the bond portion BO in the TD direction will be referred to as a bond length BO1, and a thickness of the strand portion ST will be referred to as a step width (forwarding width) W. In the drawing, a reference symbol t denotes a plate thickness of a material, and a reference symbol D denotes a total thickness of the expanded metal. Note that FIG. 17 shows the FD direction (materials forwarding direction), the TD direction (tool forwarding direction) and the WD direction (the mesh step width direction) together.

As is evident from these names, the hexagonal mesh 22 takes a mesh shape in which the bond portion BO is long, while the rhomboid mesh 26 takes a mesh shape in which the bond portion BO is short. An FD direction sectional shape (A-A sectional shape) of the rhomboid mesh 26 is identical to an FD direction sectional shape (A'-A' sectional shape) of the hexagonal mesh 22, and therefore FIG. 17B shows both FD direction sectional shapes.

In a fuel cell according to a first embodiment of the present invention, an expanded metal is used as a gas flow passage formation member, and FIG. 1 shows an outline of the structural features of the expanded metal. More specifically, the bond portion BO connecting the mesh partially stands upright in positions where the bond length BO1 (see FIG. 17) is shortened, thereby forming a part of the strand portion ST. In other words, a part of the strand portion ST constituting the mesh of the expanded metal is formed as a continuous surface not having a step relative to the bond portion BO.

Further, in an expanded metal 28 according to the first embodiment of the present invention, the shape of an opening 30 of the expanded metal is basically hexagonal shown in FIG. 1B and FIG. 21B when seen from the WD direction, but when one trapezoid formed by halving the hexagon along a diagonal TDd of the TD direction is shifted relative to the other trapezoid in the TD direction, the hexagonal shape becomes a polygonal shape (an octagon in the illustrated example), as shown in FIG. 1A.

Further, as shown in FIG. 1A, in the opening 30 formed by the mesh of the expanded metal 28 according to the first embodiment of the present invention, the direction in which one trapezoid formed by halving the hexagon along the diagonal TDd of the TD direction is shifted relative to the other trapezoid is shifted in an identical TD direction over a plurality of openings arranged in the materials forwarding direction FD.

More specifically, in the example of FIG. 1A, an opening indicated by a reference symbol 30L is formed by shifting to the left an illustrated upper half of the trapezoids formed by halving the hexagon along the diagonal TDd of the TD direction relative to a lower half in the TD direction such that three continuous openings 30L are formed in the FD direction. Further, an opening indicated by a reference symbol 30R is formed by shifting to the right an illustrated upper half of the trapezoids formed by halving the hexagon along the diagonal TDd of the TD direction relative to a lower half in the TD direction such that three continuous openings 30R are formed in the FD direction.

Further, as shown in FIGS. 2 and 3, the shape of the opening 30 formed by the mesh of the expanded metal 28 may be varied appropriately by modifying the shift amount by which one of the trapezoids formed by halving the hexagon along the diagonal TDd of the TD direction is shifted relative to the other trapezoid in the TD direction.

More specifically, FIG. 2A shows an example in which the TD direction shift amount is set at a maximum allowable shift amount such that the bond length BO1 of the bond portion BO takes a minimum bond length at which a required strength can be secured in the bond portion BO, and FIG. 3A is a three-dimensional pattern diagram corresponding to FIG. 2A. Further, FIG. 2B shows an example in which the TD direction shift amount is set such that the bond length BO1 is half that of the bond portion BO of the basic hexagon, and FIG. 3B is a three-dimensional pattern diagram corresponding to FIG. 2B. Furthermore, FIG. 2C shows an example in which the TD direction shift amount is reduced such that the bond length BO1 is slightly shorter than the bond length of the bond portion BO of the basic hexagon, and FIG. 3C is a three-dimensional pattern diagram corresponding to FIG. 2C.

Referring to FIGS. 4 to 7, a procedure for manufacturing the expanded metal 28 according to the first embodiment of the present invention will now be described.

A manufacturing device for manufacturing the expanded metal 28 includes a mold having a die 32, an upper blade 34 and a lower receiving blade 36, and a roller 40 for feeding a flat plate material 38 in the FD direction, as shown in FIGS. 4 and 5. The upper blade 34 shifts in the TD direction (which is orthogonal to the FD direction) and rises/falls in the WD direction (up-down direction). Trapezoid projections 34a are formed on a lower surface of the upper blade 34 at fixed intervals in the TD direction.

The flat plate material 38 is fed into the mold by the roller 40 at a predetermined step width W, and the flat plate material 38 is partially sheared by the trapezoid projections 34a and the die 32 and sandwiched between the upper blade 34 and the lower receiving blade 36. As a result, trapezoid raised cutouts are formed in the flat plate material 38. Further, the upper blade 34 is shifted in the TD direction every time the upper blade 34 rises such that the trapezoid raised cutouts are formed one step at a time in a zigzag pattern, and as a result, a lathe cut metal 28' having a staircase-shaped mesh is formed. The lathe cut metal 28' having the staircase-shaped mesh is then rolled by a rolling roller 42 shown in FIG. 6, whereby the expanded metal 28 is Ruined with the required total thickness D (see FIG. 17B).

When the flat plate material 38 is fed into the mold by the roller 40 at the predetermined step width W and the trapezoid raised cutouts are formed one step at a time in the flat plate material 38 by shifting the upper blade 34 in the TD direction every time the upper blade 34 is raised and lowered, the opening of the expanded metal 28 (the lathe cut metal 28') is formed into the basic hexagonal shape by causing the upper blade 34 to perform an alternating reciprocating shift operation in the TD direction at half a pitch P of the disposal intervals of the trapezoid projections 34a formed on the upper blade 34, as indicated by circled numerals 1-2-1-2 in FIG. 7B.

However, in the first embodiment of the present invention, when the flat plate material 38 is fed into the mold by the roller 40 at the predetermined step width W and the upper blade 34 is shifted in the TD direction every time the upper blade 34 is raised and lowered, the expanded metal 28 having the polygonal openings 30 shown in FIGS. 1 to 3 may be manufactured by performing a shift operation to continuously shift the upper blade 34 in an identical TD direction and then continuously returning the upper blade 34 in the opposite TD direction at a pitch (⅓P in the example in the drawing) that is divided further from half the pitch P of the disposal intervals of the trapezoid projections 34a formed on the upper blade 34, as indicated by circled numerals 1-2-3-4-3-2-1 in FIG. 7A.

Further, in the expanded metal manufacturing device, the number of continuous formations formed during continuous feeding in the identical TD direction may be varied in each location or region of the expanded metal by modifying a TD direction shift control logic of the upper blade 34, as shown in FIG. 8. Note that in the example shown in FIG. 8, the number of continuous formations in a region R1 near a gas flow inlet of the cell is large (using the example shown in FIG. 7A, the shift operation of the upper blade 34 in the TD direction is set at 1-2-3-4-5-6-5-4-3-2-1), the number of continuous formations in a region R3 near a gas flow outlet is small (1-2-3-2-1), and the number of continuous formations in an intermediate region R2 between the gas flow inlet and the gas flow outlet is an intermediate number (1-2-3-4-5-4-3-2-1).

Further, in the first embodiment of the present invention, at the manufacturing stage of the lathe cut metal 28', the flat plate material 38 may be fed into the mold by the roller 40 such that the step width of the mesh differs in the FD direction, thereby varying the total thickness in the FD direction, and in the rolling process performed by the rolling roller 42 shown in FIG. 6, the expanded metal 28 may be molded such that the total thickness is constant in the FD direction. For example, as shown in FIG. 9A, the lathe cut metal 28' is molded such that at least one of the step width and a step depth varies gradually, or in other words such that the step width W in the region R1 close to the gas flow inlet of the cell is narrow, the step width W in the region R3 close to the gas flow outlet is wide, and the step width W in the intermediate region R2 between the gas flow inlet and the gas flow outlet takes an intermediate width, and the expanded metal 28 shown in FIG. 9B is molded by rolling the lathe cut metal 28' such that the total thickness is constant in the FD direction.

Further, in the first embodiment of the present invention, at least one of the continuous number in the FD direction of the openings shifted in an identical TD direction, and a shift amount by which one of the trapezoids formed by halving the hexagon of the opening 30 formed by the mesh of the expanded metal 28 along the diagonal of the TD direction is shifted relative to the other trapezoid in the TD direction, may be varied in each of a plurality of stacked cells. For example, in a stack 40 shown in FIG. 10, the continuous number of the openings and the shift amount in the expanded metal of an end portion cell 10E are increased over the entire cell 10E. Note that in FIG. 10, a reference numeral 42 denotes a gas inlet distributor of the stack 40 and a reference numeral 44 denotes a gas outlet.

According to the first embodiment of the present invention having the constitution described above, the following actions and effects can be obtained.

As shown in FIGS. 1A, 2 and 3, in the fuel cell according to the first embodiment of the present invention, the bond portion BO connecting the mesh of the expanded metal 28 stands partially upright in a position where the bond length BO1 is shortened, thereby forming a part of the strand portion ST. In other words, a part of the strand portion ST constituting the mesh of the expanded metal 28 is molded as a continuous surface not having a step relative to the bond portion BO. Hence, when the opening 30 formed by the mesh of the expanded metal 28 is viewed in the FD direction, a surface area on which front and rear openings 30 overlap in the TD direction increases, whereby a sectional area of a plurality of substantially channel-shaped gas flow passages constituted by a continuum in the FD direction of the openings overlapping in the TD direction increases.

Further, as shown in FIGS. 1A, 2, 3 and 21A, the shape of the opening 30 formed by the mesh of the expanded metal 28 is basically hexagonal when viewed in the WD direction, but when one trapezoid formed by halving the hexagon along the diagonal TDd (FIG. 1B) of the TD direction is shifted relative to the other trapezoid in the TD direction, the hexagonal shape becomes a polygonal shape. As a result, the TD direction width of the opening shape is larger than that of the basic hexagon when viewed in the FD direction, and the surface area on which the front and rear openings overlap in the TD direction increases when viewed in the FD direction. Hence, the sectional area of the plurality of substantially channel-shaped gas flow passages constituted by the continuum in the FD direction of the openings overlapping in the TD direction increases.

More specifically, as shown by the image diagram in FIG. 11, a gas flow passage 46PA (FIG. 11B) of a typical expanded metal 20 in which hexagonal openings are disposed in a zigzag pattern is formed in a narrow region of a contact portion with the gas diffusion layer 14 or the separator 18, whereas gas flow passages 46I (FIG. 11A) of the expanded metal 28 according to this embodiment are formed widely in the vicinity of the contact portion with the gas diffusion layer 14 or the separator 18. Therefore, gas flows through the gas flow passages 46I formed by the expanded metal disposed between the cell constitutional members without making repeated narrow turns, and as a result, a reduction in gas pressure loss can be achieved.

Furthermore, according to the first embodiment of the present invention, in the opening formed by the mesh of the expanded metal, the direction in which one trapezoid formed by halving the hexagon along the diagonal TDd of the TD direction is shifted relative to the other trapezoid is shifted in an identical TD direction over a plurality of openings arranged in the FD direction, and therefore the plurality of substantially channel-shaped gas flow passages 461 constituted by the continuum in the FD direction of the openings overlapping in the TD direction are formed as FD direction flow passages that deviate toward an identical TD direction over the plurality of openings arranged in the FD direction. More specifically, as shown in FIG. 1A, a gas flow GF forms an FD direction flow that deviates toward an identical TD direction without meandering while flowing through the plurality of openings 30 (30R) shifted in the identical TD direction, and as a result, a reduction in gas pressure loss can be achieved. When the shift direction is modified, the gas flow GF turns in the opposite TD direction in the modification position and then forms an FD direction flow that deviates toward an identical TD direction without meandering while flowing through the plurality of openings 30 (30L) shifted in the identical TD direction.

By adjusting the position (timing) in which the flow direction of the gas flow turns appropriately in accordance with the number in the FD direction of the openings shifted in an identical TD direction, gas pressure loss can be suppressed over the entire cell, and required performance values of an air compressor, a hydrogen circulation pump, and so on can be suppressed. Hence, an increase in the size of these accessories can be prevented, and as a result, a corresponding increase in the size of the fuel cell system can be prevented. Furthermore, when the gas flow passages 461 function as discharge paths for discharging generated water generated by the diffusion layer, a generated water passage area is increased such that the generated water is discharged smoothly. As a result, a concentration overvoltage decreases, leading to an improvement in output and an increase in voltage stability.

Further, to ensure that the generated water is discharged smoothly, a gas flow velocity is preferably increased toward the flow passage outlet, and therefore, as shown in FIG. 8, the number of continuous formations in an identical TD direction in the region R1 close to the gas flow inlet of the cell is increased, the number of continuous formations in an identical TD direction in the region R3 near the gas flow outlet is decreased, and the number of continuous formations in an identical TD direction in the intermediate region R2 between the gas flow inlet and the gas flow outlet is set at an intermediate number. Thus, the pressure loss of the gas flow passage can be varied intentionally, whereby the gas flow velocity in the gas flow passage 16 can be partially increased as required.

By varying the continuous number in the materials forwarding direction of the openings shifted in an identical TD direction in desired locations and regions of the expanded metal in this manner, the gas flow (turn frequency, flow velocity, gas pressure loss, and so on) can be adjusted appropriately in each location or region of a single cell.

Further, according to the first embodiment of the present invention, as the shift amount by which one of the trapezoids formed by halving the hexagon along the diagonal of the TD direction is shifted relative to the other trapezoid in the TD direction increases, the surface area on which front and rear openings overlap in the TD direction increases from the FD direction, leading to an increase in the sectional area of the plurality of substantially channel-shaped gas flow passages 461 (see FIG. 11A) constituted by the continuum in the FD direction of the openings overlapping in the TD direction. Hence, in the fuel cell according to the first embodiment of the present invention, the shift amount by which one of the trapezoids formed by halving the hexagon of the opening formed by the mesh of the expanded metal 28 along a diagonal TDd of the TD direction is shifted relative to the other trapezoid in the TD direction can be varied in desired locations or regions of the expanded metal, and as a result, the gas flow (flow velocity, gas pressure loss, and so on) can be adjusted appropriately in desired locations or regions of a single cell.

Note that FIG. 12 shows a relationship between a gas flow rate GFge during power generation and a gas pressure loss GPlo during power generation, and the present inventors have confirmed that the gas pressure loss decreases as the shift amount in the TD direction increases (TDB>TDS).

Further, in the fuel cell according to the first embodiment of the present invention, as shown in FIG. 9, at least one of the step width and step depth of the mesh of the expanded metal 28 differs in the FD direction while the overall thickness thereof is fixed in the FD direction, and therefore, in the location or region R3 in which the step width of the mesh is large, the opening length per mesh is great (the mesh is coarse) when seen from the FD direction. In the location or region R1 in which the step width of the mesh is small, on the other hand, the opening length per mesh is short the mesh is fine) when seen from the FD direction. Hence, in a location or region where the step width of the mesh is large, the gas flow GF flows while making wide turns, whereas in a location or region where the step width of the mesh is small, the gas flow GF flows while making narrow turns. Thus, the position (timing) in which the flow direction of the gas flow turns can be adjusted appropriately in accordance with the step width of the mesh, and as a result, similar actions and effects to those of the example shown in FIG. 8 can be obtained.

Furthermore, in the fuel cell according to the first embodiment of the present invention, at least one of the continuous number in the FD direction of the openings shifted in an identical TD direction and the shift amount by which one of the trapezoids formed by halving the hexagon of the opening formed by the mesh of the expanded metal along the diagonal of the TD direction is shifted relative to the other trapezoid in the TD direction is varied in each of the plurality of stacked cells, and therefore the gas flow can be adjusted appropriately to an optimum gas flow in each cell. For example, in the typical stack 40, it is difficult for the gas to reach the end portion cell 10E and more difficult to discharge generated water from this cell than from other cells, and therefore a cell voltage is likely to decrease dramatically. Hence, as shown in FIG. 10, the expanded metal 28 of the end portion cell 10E is formed in advance such that the gas pressure loss is reduced in accordance with the example described above, and in so doing, water discharge from the end portion cell is promoted, thereby preventing a reduction in the cell voltage. In other words, by forming the expanded metal 28 such that the gas flow (turning frequency, flow velocity, gas pressure loss, and so on) of each cell is adjusted as required, an optimum stack 40 can be constructed. Furthermore, by employing the expanded metal 28 in a plurality of end portion cells, not only the end portion cell 10E, a more appropriate gas flow can be obtained throughout the entire stack 40.

As described above, the basic shape of the opening 30 formed by the mesh is a hexagon when seen from the WD direction, as shown in FIGS. 1A, 2 and 3, and the expanded metal 28 that forms a polygon when one of the trapezoids formed by halving the hexagon along the diagonal TDd (FIG. 1B) of the TD direction is shifted relative to the other trapezoid in the TD direction may be provided in one or both of the anode side/cathode side gas flow passages 16A, 16C. Hence, the structure of the employed expanded metal is preferably studied appropriately.

Next, a second embodiment of the present invention will be described with reference to FIGS. 13 to 16. Here, detailed description of parts that are identical or correspond to the related art and the first embodiment of the present invention has been omitted.

As shown by the plan view in FIG. 13, in a cell 10 according to the second embodiment of the present invention, a gas flow passage 16 (see FIG. 18) is constituted by an expanded metal 50 shown as a projection. As shown by the unit perspective view in FIG. 14, the expanded metal 50 includes a location or region 52 in which the shift amount by which one of the trapezoids formed by halving the hexagon of the opening formed by the mesh of the expanded metal along the diagonal of the tool forwarding direction is shifted relative to the other trapezoid in the tool forwarding direction is zero. The region 52 in which the shift amount is zero basically corresponds to a location or region in which the opening takes the basic hexagonal shape.

More specifically, the second embodiment of the present invention includes the location or region 52 in which the shift amount by which one of the trapezoids formed by halving the hexagon of the opening formed by the mesh of the expanded metal 50 along the diagonal of the TD direction is shifted relative to the other trapezoid in the TD direction is smaller (zero at a minimum, as shown in FIG. 14) than other locations or regions 55, 56 of the expanded metal 50 adjacent to the location or region 52 in the FD direction. This is different from the first embodiment of the present invention, in which the openings 30 formed by the mesh 28 of the expanded metal 20 are all polygons when seen from the WD direction of the mesh.

Further, in the second embodiment of the present invention, the continuum in a shift direction of the openings shifted in an identical TD direction is interrupted on either side of the location or region 52 in which the shift amount by which one of the trapezoids formed by halving the hexagon of the opening formed by the mesh of the expanded metal 50 along the diagonal of the TD direction is shifted relative to the other trapezoid in the TD direction is either zero or smaller than that of locations or regions 54, 56 adjacent to the location or region 52 in the FD direction. In other words, in the example of FIG. 14, the location or region 54 is shifted in the leftward TD direction and the location or region 56 is shifted in the rightward TD direction.

With the second embodiment of the present invention constituted as described above, the following actions and effects can be obtained. As shown in FIG. 15A, in the location or region 52 in which the shift amount by which one of the trapezoids formed by halving the hexagon of the opening formed by the mesh of the expanded metal 50 along the diagonal of the TD direction is shifted relative to the other trapezoid in the TD direction is smaller than that of other locations or regions adjacent thereto in the FD direction, the sectional area of the plurality of substantially channel-shaped gas flow passages constituted by the continuum in the FD direction of the openings overlapping in the TD direction is partially reduced.

As a result, the gas flow flowing through the gas flow passage 16 (FIG. 18) formed by the expanded metal 50 is partially throttled such that a part of generated water W flowing toward a gas flow passage outlet diverges in the TD direction. Generated water W1, W2 flowing through the plurality of substantially channel-shaped gas flow passages disposed in parallel then comes into contact such that a single water flow W3 is formed by mutual surface tension, and as a result, water discharge through another gas flow passage is promoted. Hence, an increase in gas pressure loss due to residual generated water can be suppressed.

As a comparative example, FIG. 15B shows the expanded metal 28 according to the first embodiment of the present invention. Here, the gas flow GF flowing through the plurality of substantially channel-shaped gas flow passages disposed in parallel forms highly independent flows, and therefore gas or generated water W is less likely to be exchanged between adjacent passages or with the separator 18 side (FIG. 18) and the GDL 12 side (FIG. 18) than in the second embodiment of the present invention. This tendency is particularly marked during a low load operation of the fuel cell.

Hence, when a situation arises in the first embodiment of the present invention in which generated water discharge deviates to a specific gas flow passage such that the generated water W remains in another gas flow passage, leading to a possible increase in gas pressure loss, discharge of the generated water W can be promoted in the second embodiment of the present invention, and as a result, an increase in gas pressure loss due to residual generated water can be suppressed.

Further, in the location or region 52, the continuum in the shift direction of the openings shifted in an identical TD direction is interrupted such that an elbow portion or a crank portion is partially formed in the plurality of substantially channel-shaped gas flow passages constituted by the continuum in the FD direction of the openings overlapping in the TD direction. As a result, the gas flow GF flowing through the gas flow passages formed by the expanded metal 50 partially curves or meanders in the elbow portion or crank portion such that a part of the gas flow GF diverges in the TD direction. Accordingly, a part of the generated water flowing toward the gas flow passage outlet also diverges in the TD direction, and as a result, the effect described above can be obtained.

Note that in the examples shown in FIGS. 14 and 15A, the locations or regions 54, 56 sandwiching the location or region 52 turn back in the TD direction, but the locations or regions 54, 56 do not necessarily have to be constituted in this fashion and may both be shifted in an identical TD direction.

Further, as shown by a different example in FIG. 16, a location or region 58 that turns back frequently in the TD direction may be formed while keeping the shift amount by which one of the trapezoids formed by halving the hexagon of the opening formed by the mesh of the expanded metal 50 along the diagonal of the TD direction is shifted relative to the other trapezoid in the TD direction constant.

In this case, the continuous number in the FD direction of the openings shifted in an identical TD direction, differs in each location or region of the expanded metal 50, but since the gas flow GF flowing through the gas flow passages formed by the expanded metal 50 partially curves or meanders such that a part thereof diverges in the TD direction, causing a part of the generated water flowing toward the gas flow passage outlet to diverge in the TD direction, similar actions and effects to those described above can be obtained.

Other actions and effects are similar to those of the first embodiment of the present invention, and therefore detailed description thereof has been omitted.

DESCRIPTION OF REFERENCE NUMERALS 10 cell
10E end portion cell

12 MEA
14, 14A, 14C gas diffusion layer
16, 16A, 16C gas flow passage
18, 18A, 18C separator
20, 28, 50 expanded metal
22 hexagonal mesh
24 gas flow passage
30 opening
40 stack
52 region in which a shift amount by which one of the trapezoids formed by halving the hexagonal opening of the mesh of the expanded metal along a diagonal of a tool forwarding direction is shifted relative to the other trapezoid in the tool forwarding direction is zero
W, W1, W2, W3 generated water

The invention claimed is:

1. A fuel cell having a cell structure in which a gas flow passage is formed by an expanded metal disposed between cell constitutional members, the expanded metal being configured to have a mesh,
wherein the mesh includes a plurality of bond portions, and a plurality of strand portions in at least a first plane and a second plane, the first plane being parallel to the second plane, and the first plane and the second plane being arranged in a materials forwarding direction,
wherein each of the plurality of strand portions includes at least one of an inclined segment and a non-inclined segment, the non-inclined segment extending in a tool forwarding direction and the inclined segment elevating from the tool forwarding direction, the tool forwarding direction being orthogonal to the materials forwarding direction,
wherein the plurality of bond portions connect non-inclined segments of strand portions in the first plane to non-inclined segments of strand portions in the second plane to form a plurality of openings, each of the plurality of openings having an upper-half portion and a lower-half portion when each of the plurality of openings is halved along a diagonal in the tool forwarding direction,
wherein the upper-half portion is shifted relative to the lower-half portion in the tool forwarding direction, and
wherein the plurality of openings are repeatedly formed for a predetermined number of times such that the plurality of openings are arranged to form a wave-like passage in the materials forwarding direction.

2. The fuel cell according to claim 1, wherein a shape of at least one of the plurality of openings formed by the mesh of the expanded metal is basically hexagonal when seen from a step width direction of the mesh, and becomes polygonal when one trapezoid formed by halving the hexagon along a diagonal of the tool forwarding direction is shifted relative to the other trapezoid in the tool forwarding direction.

3. The fuel cell according to claim 2, wherein one of the trapezoids formed by halving the hexagon of the at least one of the plurality of openings formed by the mesh of the expanded metal along the diagonal of the tool forwarding direction is shifted relative to the other trapezoid in an identical tool forwarding direction over a plurality of openings arranged in a materials forwarding direction.

4. The fuel cell according to claim 3, wherein a continuous number in the materials forwarding direction of the at least one of the plurality of openings shifted in the identical tool forwarding direction differs in each location or region of the expanded metal.

5. The fuel cell according to claim 3, wherein at least one of a continuous number in the materials forwarding direction of the at least one of the plurality of openings shifted in the tool forwarding direction, a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction, and the location or region in which the shift amount is either zero or smaller than a shift amount in another location or region adjacent thereto in the materials forwarding direction, is varied in each of a plurality of stacked cells.

6. The fuel cell according to claim 2, wherein a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction differs in each location or region of the expanded metal.

7. The fuel cell according to claim 2, wherein the at least one of the plurality of openings formed by the mesh of the expanded metal is polygonal when seen from the step width direction of the mesh.

8. The fuel cell according to claim 2, comprising a location or region in which a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction is either zero or smaller than a shift amount in another location or region adjacent thereto in a materials forwarding direction.

9. The fuel cell according to claim 8, wherein a continuum in a shift direction of the at least one of the plurality of openings shifted in the identical tool forwarding direction is interrupted on either side of the location or region in which a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction is either zero or smaller than a shift amount in another location or region adjacent thereto in the materials forwarding direction.

10. The fuel cell according to claim 1, wherein at least one of a step width and a step depth of the mesh of the expanded metal differs in a materials forwarding direction while an overall thickness thereof is fixed in the materials forwarding direction.

11. A fuel cell having a cell structure in which a gas flow passage is formed by an expanded metal disposed between cell constitutional members, the expanded metal being configured to have a mesh,
wherein the mesh includes a plurality of bond portions, and a plurality of strand portions in at least a first plane and a second plane, the first plane being parallel to the second plane, and the first plane and the second plane being separated from each other in a materials forwarding direction,
wherein the plurality of bond portions connect strand portions in the first plane to strand portions in the second plane to form a plurality of openings each of the plurality of openings having an upper-half portion and a lower-half portion when each of the plurality of openings is halved along a diagonal in a tool forwarding direction, wherein the upper-half portion is shifted relative to the lower-half portion in the tool forwarding direction, wherein each of the plurality of strand portions include an inclined segment and a non-inclined segment, the non-inclined segment extending in the tool forwarding direction and the inclined segment elevating from the tool forwarding direction, and wherein each of the plurality of bond portions is aligned with a fraction of an edge of a non-inclined segment connected to the bond portion, thereby forming a continuous surface not having a step relative to the fraction of the edge of the non-inclined segment.

12. The fuel cell according to claim 11, wherein a shape of at least one of the plurality of openings formed by the mesh of the expanded metal is basically hexagonal when seen from a step width direction of the mesh, and becomes polygonal when one trapezoid formed by halving the hexagon along a diagonal of a tool forwarding direction is shifted relative to the other trapezoid in the tool forwarding direction.

13. The fuel cell according to claim 12, wherein one of the trapezoids formed by halving the hexagon of the at least one of the plurality of openings formed by the mesh of the expanded metal along the diagonal of the tool forwarding direction is shifted relative to the other trapezoid in an identical tool forwarding direction over a plurality of openings arranged in a materials forwarding direction.

14. The fuel cell according to claim 13, wherein a continuous number in the materials forwarding direction of the openings shifted in the identical tool forwarding direction differs in each location or region of the expanded metal.

15. The fuel cell according to claim 13, wherein at least one of a continuous number in the materials forwarding direction of the at least one of the plurality of openings shifted in the tool forwarding direction, a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction, and the location or region in which the shift amount is either zero or smaller than a shift amount in another location or region adjacent thereto in the materials forwarding direction, is varied in each of a plurality of stacked cells.

16. The fuel cell according to claim 12, wherein a shift amount by which one of the trapezoids formed by halving the hexagon of the opening formed by the mesh of the expanded metal along the diagonal of the tool forwarding direction is shifted relative to the other trapezoid in the tool forwarding direction differs in each location or region of the expanded metal.

17. The fuel cell according to claim 12, wherein all of the plurality of openings formed by the mesh of the expanded metal are polygonal when seen from the step width direction of the mesh.

18. The fuel cell according to claim 12, comprising a location or region in which a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction is either zero or smaller than a shift amount in another location or region adjacent thereto in a materials forwarding direction.

19. The fuel cell according to claim 12, wherein a continuum in a shift direction of the at least one of the plurality of openings shifted in the identical tool forwarding direction is interrupted on either side of the location or region in which a shift amount by which one of the trapezoids formed by halving the hexagon of the at least one of the plurality of openings formed by the mesh of the expanded metal along the diagonal of the tool forwarding direction is shifted relative to the other trapezoid in the tool forwarding direction is either zero or smaller than a shift amount in another location or region adjacent thereto in a materials forwarding direction.

20. The fuel cell according to claim 11, wherein at least one of a step width and a step depth of the mesh of the expanded metal differs in a materials forwarding direction while an overall thickness thereof is fixed in the materials forwarding direction.

21. A fuel cell having a cell structure in which a gas flow passage is formed by an expanded metal disposed between cell constitutional members, wherein an opening shape of a plurality of openings of the expanded metal is basically hexagonal when seen from a step width direction of the mesh, and becomes polygonal when one trapezoid formed by halving the hexagon along a diagonal of a tool forwarding direction is shifted relative to the other trapezoid in the tool forwarding direction.

22. The fuel cell according to claim 21, wherein one of the trapezoids formed by halving the hexagon of at least one of the plurality of openings formed by the mesh of the expanded metal along the diagonal of the tool forwarding direction is shifted relative to the other trapezoid in an identical tool forwarding direction over a plurality of openings arranged in a materials forwarding direction.

23. The fuel cell according to claim 22, wherein a continuous number in the materials forwarding direction of the openings shifted in the identical tool forwarding direction differs in each location or region of the expanded metal.

24. The fuel cell according to claim 22, wherein at least one of a continuous number in the materials forwarding direction of the openings shifted in the tool forwarding direction, a shift amount by which one of the trapezoids formed by halving the hexagon of the opening formed by the mesh of the expanded metal along the diagonal of the tool forwarding direction is shifted relative to the other trapezoid in the tool forwarding direction, and the location or region in which the shift amount is either zero or smaller than a shift amount in another location or region adjacent thereto in the materials forwarding direction, is varied in each of a plurality of stacked cells.

25. The fuel cell according to claim 21, wherein a shift amount by which one of the trapezoids formed by halving the hexagon of the opening formed by the mesh of the expanded metal along the diagonal of the tool forwarding direction is shifted relative to the other trapezoid in the tool forwarding direction differs in each location or region of the expanded metal.

26. The fuel cell according to claim 21, wherein a plurality of openings formed by the mesh of the expanded metal are polygonal when seen from the step width direction of the mesh.

27. The fuel cell according to claim 21, comprising a location or region in which a shift amount by which one of the trapezoids formed by halving the hexagon of the at least one of a plurality of openings formed by the mesh of the expanded metal along the diagonal of the tool forwarding direction is shifted relative to the other trapezoid in the tool forwarding direction is either zero or smaller than a shift amount in another location or region adjacent thereto in a materials forwarding direction.

28. The fuel cell according to claim 21, wherein at least one of a step width and a step depth of the mesh of the expanded metal differs in the materials forwarding direction while an overall thickness thereof is fixed in a materials forwarding direction.

\* \* \* \* \*